United States Patent
Hao et al.

(10) Patent No.: US 8,407,472 B2
(45) Date of Patent: Mar. 26, 2013

(54) MOBILE CONTENT DELIVERY OPTIMIZATION

(75) Inventors: Jack Jianxiu Hao, Lexington, MA (US); John F. Gallagher, Hopewell, NJ (US); Xuefeng Yao, Waban, MA (US); Yuhui Qian, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 263 days.

(21) Appl. No.: 12/880,302

(22) Filed: Sep. 13, 2010

(65) Prior Publication Data

US 2012/0066495 A1 Mar. 15, 2012

(51) Int. Cl.
*H04L 9/32* (2006.01)
(52) U.S. Cl. ...... 713/168; 709/217; 709/219; 455/456.1
(58) Field of Classification Search .................. 713/168; 709/217, 219; 455/456.1
See application file for complete search history.

(56) References Cited

U.S. PATENT DOCUMENTS

| | | | |
|---|---|---|---|
| 7,509,131 B2* | 3/2009 | Krumm et al. | 455/456.1 |
| 7,584,285 B2* | 9/2009 | Hudson et al. | 709/228 |
| 7,814,483 B2* | 10/2010 | Li et al. | 717/177 |
| 2002/0143918 A1* | 10/2002 | Soles et al. | 709/223 |
| 2007/0265023 A1* | 11/2007 | Bengtsson et al. | 455/466 |
| 2009/0094347 A1* | 4/2009 | Ting et al. | 709/219 |
| 2011/0238828 A1* | 9/2011 | Grigsby et al. | 709/224 |

* cited by examiner

*Primary Examiner* — Andrew Georgandellis (57) ABSTRACT

A device receives, from a target user device, a request for encrypted content, where the request is sent via a wireless access network. The device identifies a donor user device that is available to provide the encrypted content via a local wireless network connection, where the donor user device has previously downloaded the encrypted content. The device sends, to the target user device and/or the donor user device, instructions to establish a peer-to-peer connection, via the local wireless network, to provide the encrypted content to the target user device, where the encrypted content is decrypted by the target user device using a license key provided over a different network than the local wireless connection.

18 Claims, 10 Drawing Sheets

MOBILE CONTENT DELIVERY OPTIMIZATION

BACKGROUND

As wireless network data rates improve using third generation (3G), fourth generation (4G), and WiFi technologies, users are using wireless networks for more and more bandwidth-intensive applications. While offering improvement over earlier generations of wireless networks, available bandwidth for today's wireless networks is not unlimited. For example, transfer of bandwidth-intensive content (such as video and multimedia content) by multiple user devices (e.g., a mobile communication device, a laptop computer, etc.) within the same area (e.g., served by the same base station) may cause users to experience degraded performance. It is desirable to use mechanisms that preserve network capacity so that network resources may be available, for example, during peak usage periods.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide mobile content delivery using a mobile peer device (e.g., a mobile handset) with WiFi capability (also called "mobile WiFi," "MiFi," or an "intelligent mobile hotspot"). The peer device can be the donor for other nearby peer devices (or "target peers") downloading the same content. Instead of using a wireless access network (e.g., a 3G or 4G network as defined by the Third Generation Partnership Project (3GPP)) the target peers may use a mobile WiFi network to retrieve content from the donor peer. Content from the donor peer may be, for example, content previously stored on the donor peer device or streamed content originating from a network server.

In one example implementation, the systems and/or methods described herein may receive, from a target peer device and via a wireless access network, a request for encrypted content. The systems and/or methods may identify a donor peer device (e.g., a donor peer device that has previously downloaded the encrypted content) that is available to provide the encrypted content via a local wireless network connection. The systems and/or methods may send, to the target peer device and/or the donor peer device, instructions to establish a peer-to-peer connection, via the local wireless network, to provide the encrypted content to the target peer device. The encrypted content may be decrypted by the target peer device using a license key provided over the wireless access network using a secure protocol.

The systems and/or methods described herein may, thus, minimize use of the wireless access network among multiple peer devices consuming the same content. High bandwidth content, such as video content, may be transferred over the wireless access network once (e.g., to a donor peer device) and distributed (e.g., via a mobile WiFi network) to one or more target peer devices. Digital rights for the content may be ensured since license keys may be provided to each peer device using reliable and secure protocols over the wireless access network.

As used herein, the terms "mobile WiFi" and "MiFi" may be used interchangeably to refer to mobile user devices acting like a WiFi router (e.g., using IEEE 802.11 standards). MiFi devices may connect to 3G and/or 4G wireless access networks to send/receive signals that allow Internet connectivity. The MiFi devices may share that connection, through WiFi in a limited radius (e.g., 30-200 feet), with other WiFi enabled devices.

As used herein, the terms "subscriber" and/or "user" may be used interchangeably. Also, the terms "subscriber" and/or "user" are intended to be broadly interpreted to include a peer device (e.g., a mobile telephone) or a user of a peer device.

Figure 1:
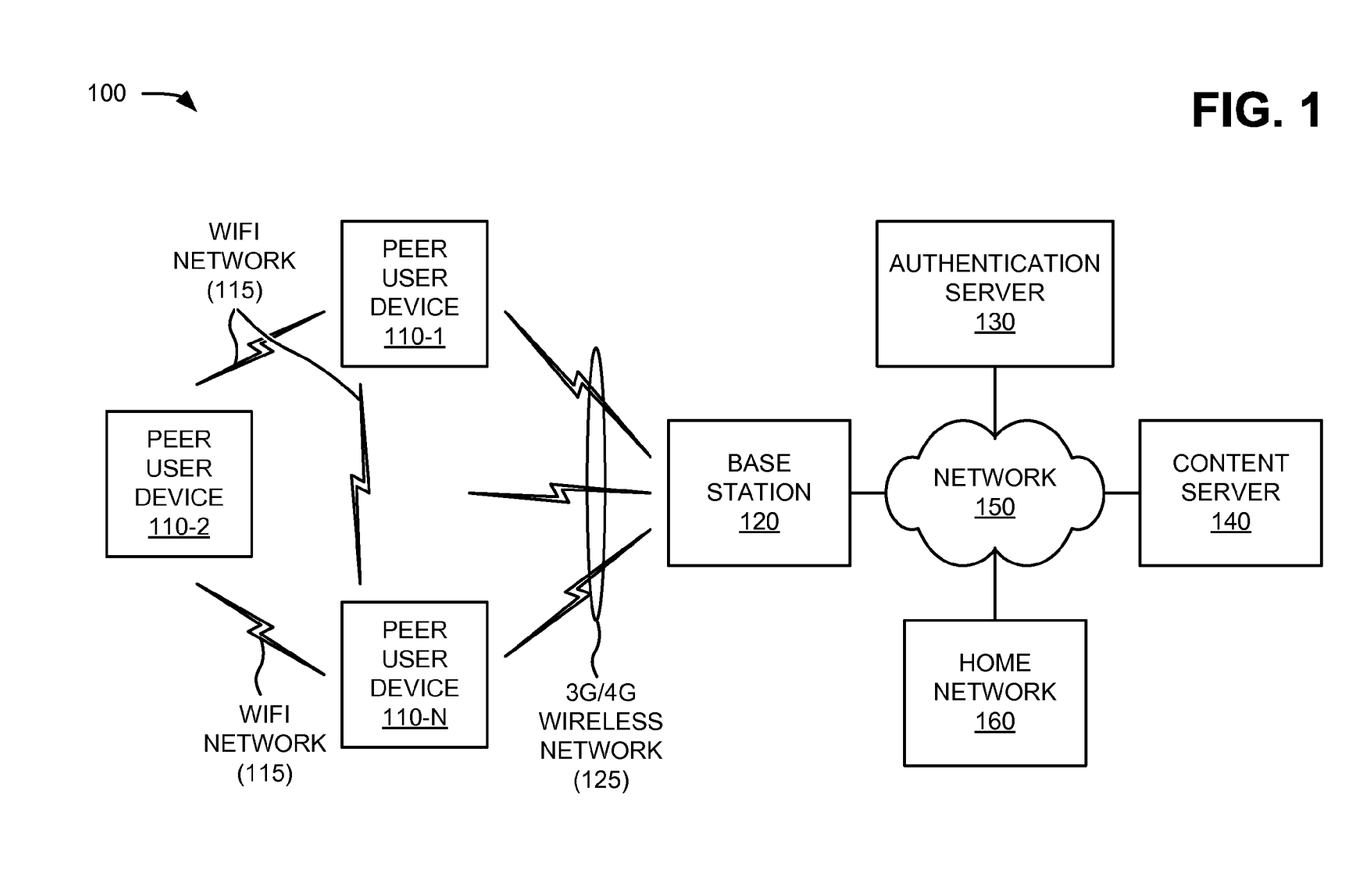
FIG. 1 is a diagram of an example network in which systems and/or methods described herein may be implemented.

FIG. 1 is a diagram of an example network 100 in which systems and/or methods described herein may be implemented. As illustrated, network 100 may include multiple peer devices 110-1, 110-2, . . . , 110-N (referred to herein collectively as "peer devices 110" or generically as "peer device 110"); a base station 120; an authentication server 130; a content server 140; a network 150; and a home network 160. Components of network 100 may interconnect via wired and/or wireless connections. Three peer devices 110 and a single base station 120, authentication server 130, content server 140, network 150, and home network 160 have been illustrated in FIG. 1 for simplicity. In practice, there may be more peer devices 110, base stations 120, authentication servers 130, content servers 140, networks 150, and/or home networks 160. In one example implementation, components of network 100 may utilize a transmission control protocol (TCP) for delivering content (e.g., packets) to and/or from one or more other components of network 100. Peer device 110 may include any device that is capable of communicating with authentication server 130, content server 140, and/or home network 160 via a wireless access network (e.g., a 3G/4G band frequency network provided by base station 120). For example, peer device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. Peer device 110 may further retrieve (e.g., from authentication server 130) and/or store credentials that may be used to obtain access to content governed by digital rights management (DRM) restrictions.

Peer device 110 may include a device that is capable of communicating with other peer devices 110 using a local wireless network, such as a WiFi network 115, to provide content to other peer devices 110 and/or obtain content from other peer devices 110. In one implementation, peer device 110 may include a MiFi-enabled device that may share stored content or content from a 3G/4G broadband connection with other peer devices 110 through WiFi network 115. Peer device 110 may also include decryption capabilities to decrypt and present (e.g., to a user) encrypted content provided, for example, from a donor peer device 110 and/or content server 140. Peer device 110 may alternatively be referred to herein as a user device.

Base station 120 may include one or more computation and/or communication devices that receive data from authentication server 130 (e.g., authentication information, secure keys, etc.), from content server 140 (e.g., video content, file transfer protocol (FTP) uploads/downloads, etc.), and/or from home network 160 via, for example, network 150 and wirelessly transmit that data to peer devices 110. Base station 120 may also include one or more devices that wirelessly receive voice and/or data (e.g., a request for video content, a FTP request, etc.) from peer devices 110 and transmit that voice and/or data to authentication server 130, content server 140, and/or home network 160 (e.g., via network 150).

In one example, base station 120 may provide a wireless access network (e.g., 3G/4G wireless network 125) for peer devices 110. 3G/4G wireless network 125, in one implementation, may correspond to a 3G network, 4G network, a Long Term Evolution (LTE) network, an advanced LTE network, etc. 3G/4G wireless network 125 may include a communications network that connects subscribers (e.g., peer devices 110) to a service provider (e.g., authentication server 130, content server 140, and/or home network 160). In another implementation, 3G/4G wireless network 125 may include an extended WiFi network (e.g., IEEE 802.11n) or other access networks (e.g., High-Speed Packet Access (HSPA), an enhanced high-rate packet data (eHRPD) network or a WiMax network).

Authentication server 130 may include one or more server devices, or other types of computation or communication devices, that gather, process, search, and/or provide information in a manner described herein. In one implementation, authentication server 130 may authenticate peer device 110 credentials to permit use of content by peer device 110. For example, a request from peer device 110 may be delivered to authentication server 130 to make sure that the user making the request is an authorized user and that the request is coming from a valid Internet protocol (IP) address. In an example implementation, authentication server 130 may include or communicate with another network component, such as an authentication, authorization, and accounting (AAA) server to authenticate a request from peer device 110.

In one implementation, authentication server 130 may also supervise DRM for transfer of content from one peer device (e.g., peer device 110-1 acting as a donor) to another peer device (e.g., peer device 110-2 acting as a target or recipient) in a secure manner. Authentication server 130 may implement control over, for example, the number of copies that may be made, who can access certain content, etc. Authentication server 130 may, for example, restrict access based on DRM properties/protections assigned by a user who creates a file. In one implementation, authentication server 130 may be a part of a network service provided by a subscription multimedia service provider and may communicate with content server 140 to track consumption content by users.

Content server 140 may include one or more server devices, or other types of computation or communication devices, that gather, process, search, and/or provide information in a manner described herein. In one implementation, content server 140 may include a computer system, an application, a cable head-end, and/or a broadcasting device capable of providing video content (e.g., video on demand (VOD) content, high definition (HD)-VOD content, TV programming, movies, on-demand services, live television, remote DVR content, etc.), commercials, advertisements, instructions, images, voice content (e.g., voice over IP (VoIP)), and/or other information to peer device 110. In implementations described herein, content server 140 may identify a donor peer device 110 that may distribute content (e.g., content previously provided to the donor peer device 110) locally to one or more other peer devices 110. If no donor peer device is available, content server 140 may provide content directly to the other peer devices (e.g., via 3G/4G wireless network 125).

Network 150 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Home network 160 may include one or more devices that may store personal content (e.g., DVR content, home videos, photographs, etc.) associated with a user of a peer device 110. Content from home network 160 may be distributed to peer device 110 via 3G/4G wireless network 125 (e.g., for distribution to other peer devices 110). Thus, home network 160 may function similarly to content server 140, with the exception that home network 160 may recognize, as donor peers, only peer devices 110 associated with home network 160.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
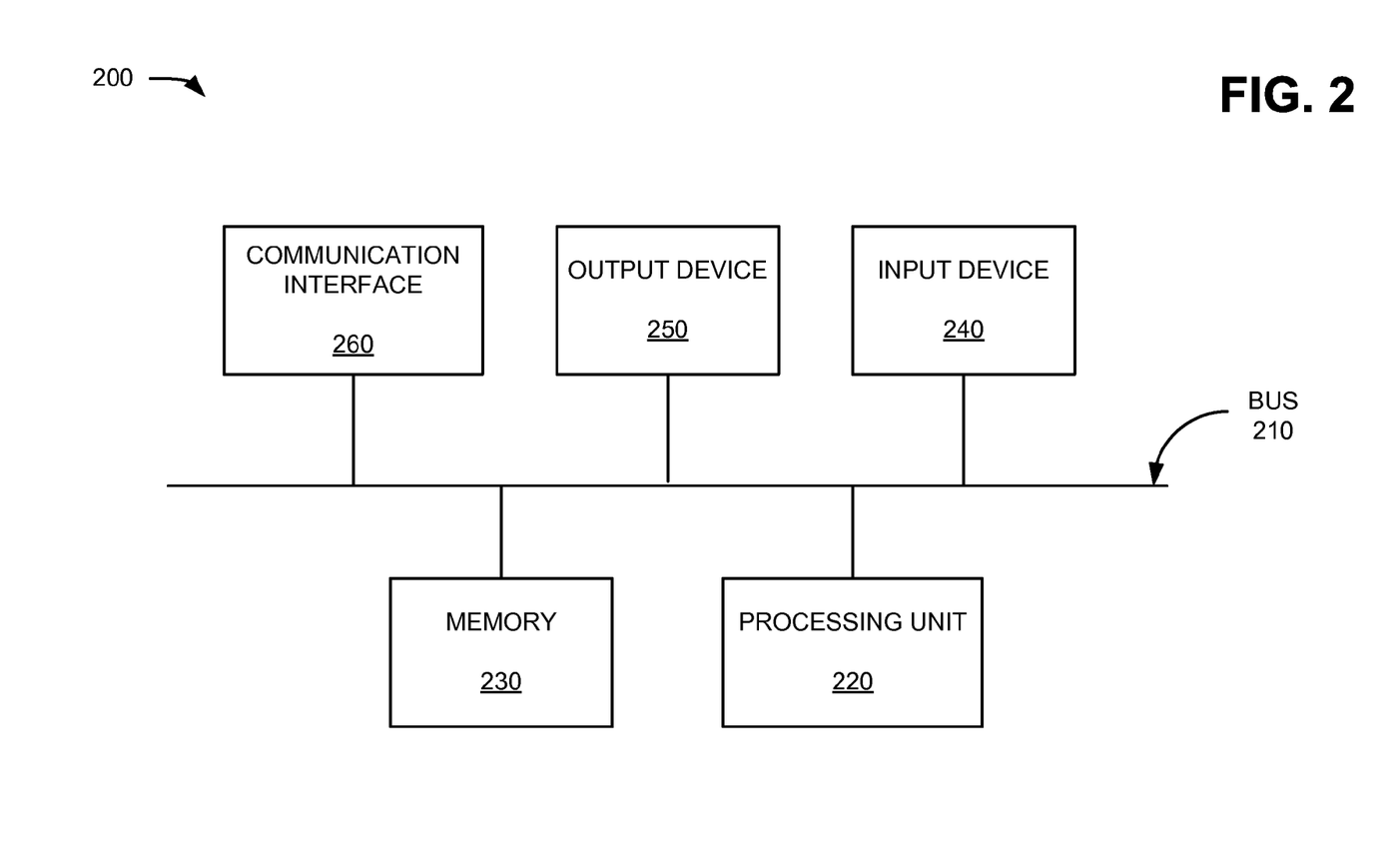
FIG. 2 is a diagram of example components of one or more of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
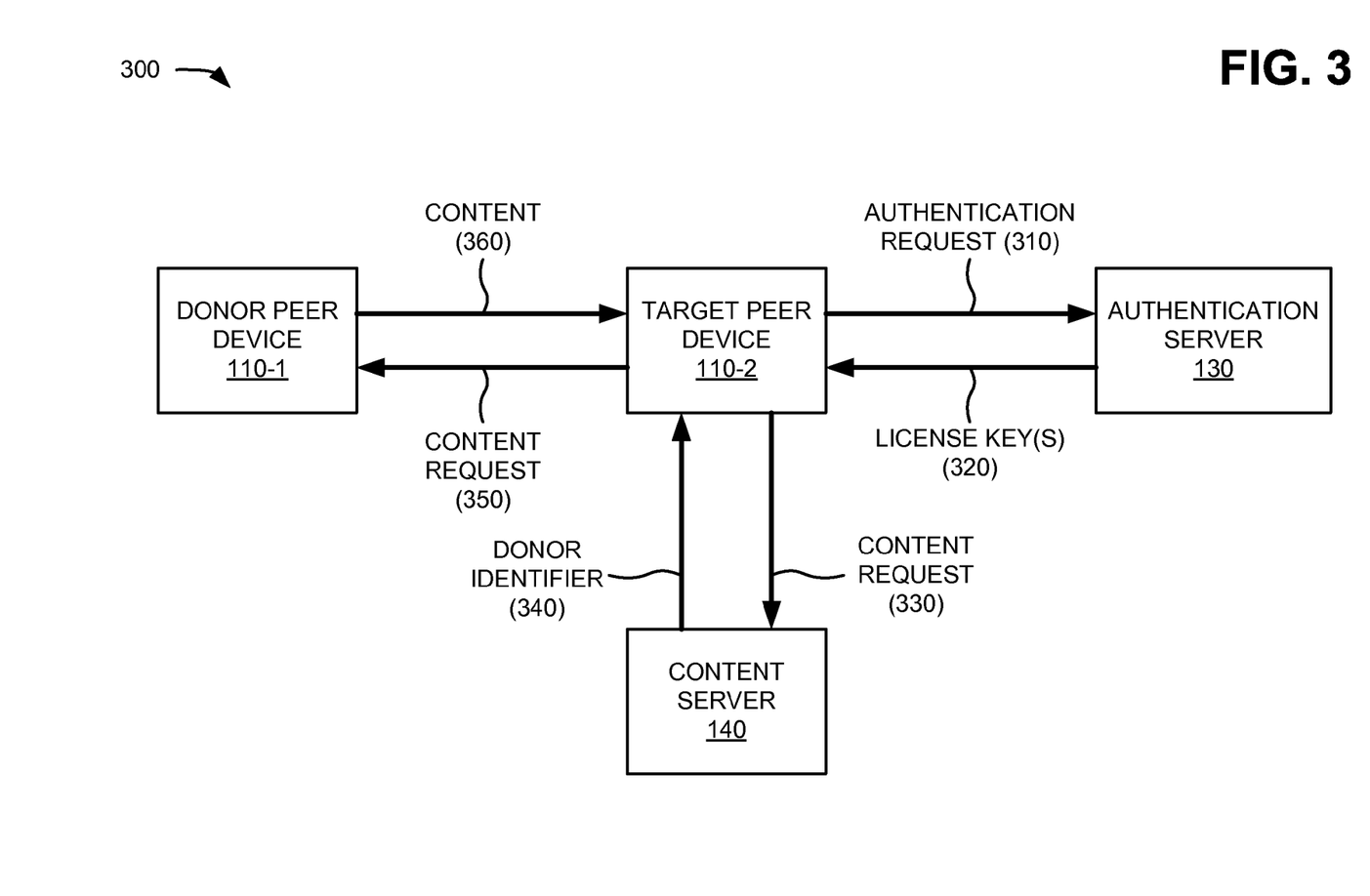
FIG. 3 is a diagram of example interactions between components of an example portion of the network depicted in FIG. 1.

FIG. 3 depicts a diagram of example interactions among components of an example portion 300 of network 100. As illustrated, example network portion 300 may include donor peer device 110-1, target peer device 110-2, authentication server 130, and content server 140. Peer devices 110-1 and 110-2, authentication server 130, and content server 140 may include the features described above in connection with one or more of FIGS. 1 and 2. Interactions shown in FIG. 3 may represent communications to support downloading purchased content (e.g., a movie or other content) to target peer device 110-2. Assume a user of target peer device 110-2 may purchase desired content, which may be encrypted, through a previous transaction (not shown) either using target peer device 110-2 or another device.

As further shown in FIG. 3, the user may utilize target peer device 110-2 to send an authentication request 310, to authentication server 130, to be authenticated for receipt of the desired content. In one implementation, target peer device 110-2 may communicate with authentication server 130 through a hypertext transfer protocol over secure socket (HTTPS) layer using 3G/4G wireless network 125 and network 150 (not shown). Authentication request 310 may include, for example, credentials associated with target peer device 110-2 and/or a user account related to the purchase of the desired content.

Authentication server 130 may receive authentication request 310. Assuming the credentials in authentication request 310 are accepted, authentication server 130 may authenticate target peer device 110-2 and verify that the user of target peer device 110-2 has purchased the requested content. Authentication server 130 may provide license key(s) for the purchased content to target peer device 110-2, as indicated by reference number 320. License key(s) 320 may also include, for example, a uniform resource locator (URL) or another identifier to access the desired content on content server 140. In one implementation, license key(s) 320 may be provided to target peer device 110-2 using HTTPS over 3G/4G wireless network 125.

Target peer device 110-2 may send (e.g., using the URL for content server 140) a content request 330 to content server 140 to request the desired content. In one implementation, target peer device 110-2 may send content request 330 as a HTTPS data call over 3G/4G wireless network 125. Content server 140 may check if there is a nearby peer device (e.g., donor peer device 110-1) with WiFi capability that that has already downloaded the content listed in content request 330. The content may be stored, for example, in a memory (e.g., memory 230) of donor peer device 110-1. Donor peer selection is described further below, for example, in connection with FIG. 7. If a suitable donor peer (e.g., donor peer device 110-1) is identified, content server 140 may direct, via a donor identifier 340, target peer device 110-2 to retrieve the requested content from donor peer device 110-1. In one implementation, donor identifier 340 may include a unique indicator (e.g., an IP address) for donor peer device 110-1.

In another implementation, content server 140 may also send a target peer device identifier (not shown), to donor peer device 110-1, to instruct that the requested content be sent to target peer device 110-2. That is, content server 140 may introduce donor peer device 110-1 and target peer device 110-2 to make a peer-to-peer connection.

Target peer device 110-2 may receive donor identifier 340 and may send a content request 350 to donor peer device 110-1 to request the desired content. In one implementation, target peer device 110-2 may send content request 350 to donor peer device 110-1 over a local wireless network (e.g., WiFi network 115). Donor peer device 110-1 may receive content request 350 and may send the requested content 360, with appropriate encryption, to target peer device 110-2 using, for example, WiFi network 115. Target peer device 110-2 may receive content 360 and apply license keys 320 to decrypt/present content 360 to the user.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
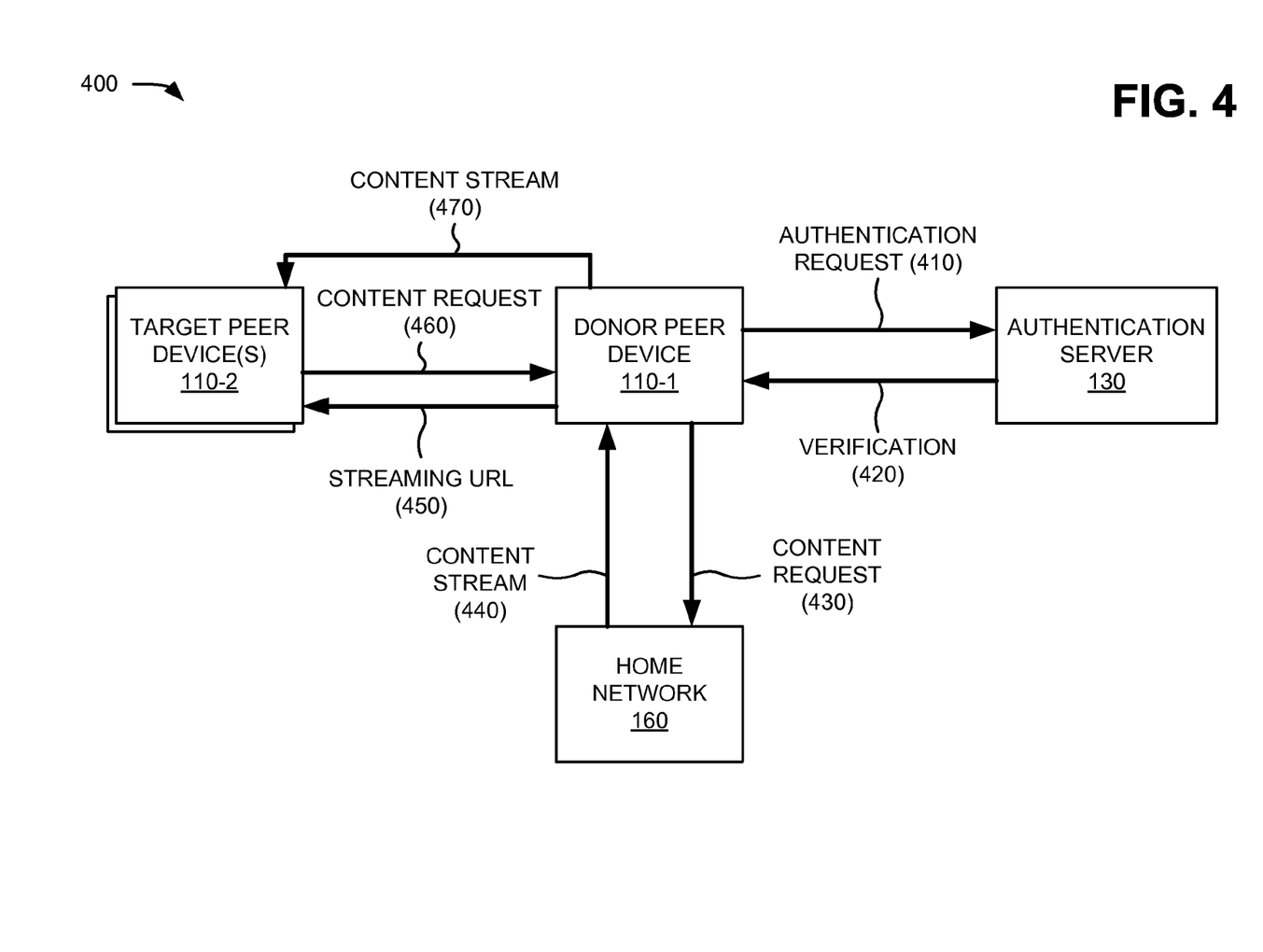
FIG. 4 is a diagram of example interactions between components of another example portion of the network depicted in FIG. 1.

FIG. 4 depicts a diagram of example interactions among components of another example portion 400 of network 100. As illustrated, example network portion 400 may include donor peer device 110-1, target peer device 110-2, target peer device 110-2, and home network 160. Peer devices 110-1 and 110-2, authentication server 130, and home network 160 may include the features described above in connection with one or more of FIGS. 1-3. Interactions shown in FIG. 4 may represent communications to support streaming of personal content (e.g., home video recordings or other unencrypted content stored on a remote server) from donor peer device 110-1 to one or more target peer devices 110-2. Assume a user of donor peer device 110-1 has previously stored personal content through a previous transaction (not shown) either using donor peer device 110-1 or another device.

As further shown in FIG. 4, the user may utilize donor peer device 110-1 to send an authentication request 410, to authentication server 130, to be authenticated to receive the personal content. In one implementation, donor peer device 110-1 may communicate with authentication server 130 through a HTTPS layer using 3G/4G wireless network 125 and network 150 (not shown). Authentication request 410 may include, for example, credentials associated with donor peer device 110-1 and/or a user account related to the storage of and/or access to the personal content.

Authentication server 130 may receive authentication request 410. Assuming the credentials in authentication request 410 are accepted, authentication server 130 may authenticate donor peer device 110-1 and verify that the requested personal content is available for streaming. Authentication server 130 may provide a verification signal to donor peer device 110-1, as indicated by reference number 420. Verification 420 may include, for example, a URL or another identifier to access the personal content on home network 160. In one implementation, verification 420 may be provided to donor peer device 110-1 using HTTPS over 3G/4G wireless network 125.

Using, for example, the URL provided by authentication server 130, donor peer device 110-1 may send a content request 430 to home network 160 to request the personal content. In one implementation, donor peer device 110-1 may send content request 430 as a HTTPS data call over 3G/4G wireless network 125. Home network 160 may retrieve the requested personal content and provide a content stream 440 to donor peer device 110-1, using for example, 3G/4G wireless network 125.

Donor peer device 110-1 may receive content stream 440 and may send a streaming URL 450 to one or more target peer devices 110-2 to enable target peer device(s) 110-2 to access content stream 440 from donor peer device 110-1 via a local wireless network (e.g., WiFi network 115). In one implementation, donor peer device 110-1 may send streaming URL 450 to target peer device(s) 110-2 via a short message service (SMS) message. Target peer device(s) 110-2 may receive streaming URL 450 and may provide a content request 460 to donor peer device 110-1, via the local wireless network (e.g., WiFi network 115), based on streaming URL 450. In response to content request 460, donor peer device 110-1 may provide content stream 470 to target peer device(s) 110-2 using, for example, WiFi network 115. Target peer device(s) 110-2 may receive content stream 470 and present content stream 470 to the respective users.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
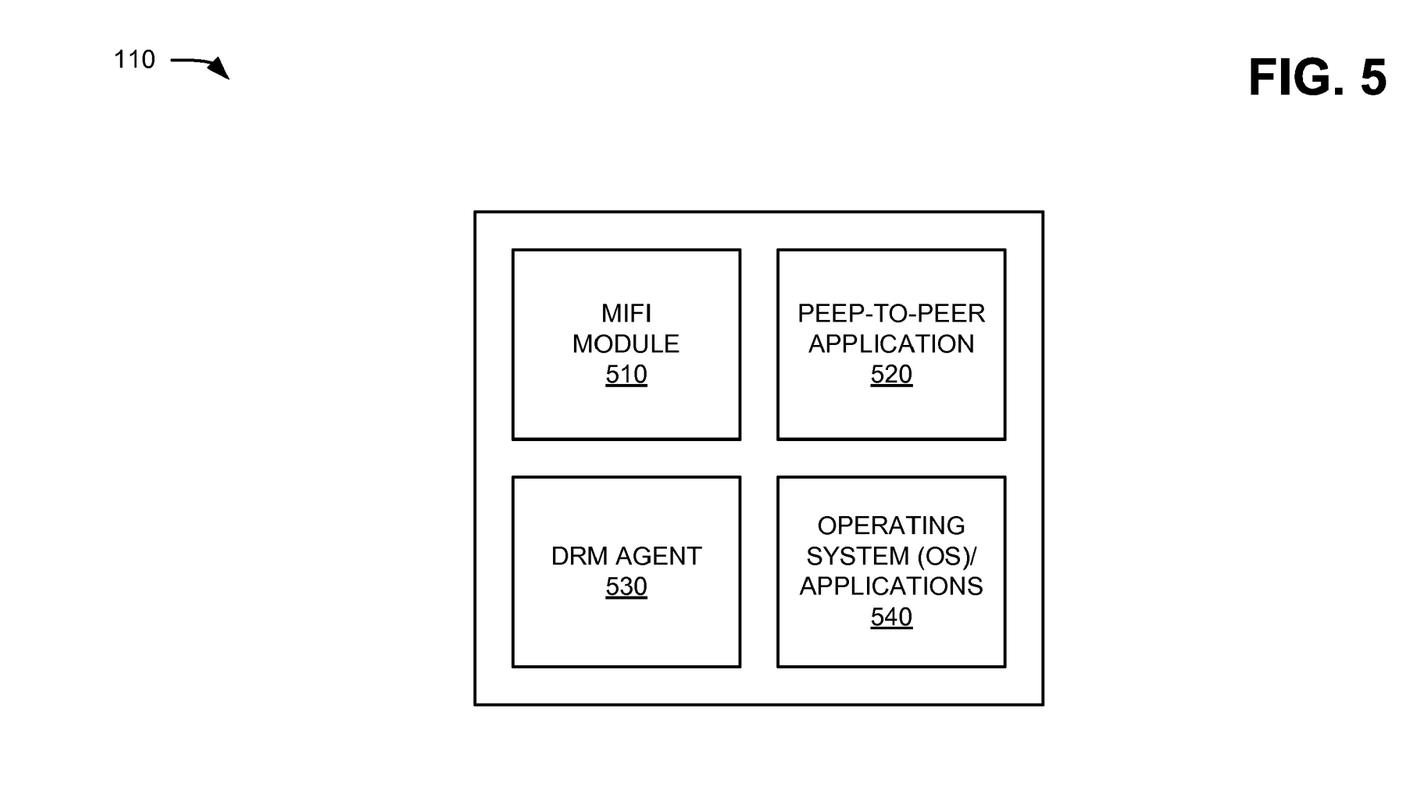
FIG. 5 is a diagram of example functional components of a peer user device of the network depicted in FIG. 1.

FIG. 5 is a diagram of example functional components of peer device 110. In one implementation, the functions described in connection with FIG. 5 may be performed by one or more components of device 200 (FIG. 2). As shown in FIG. 5, peer device 110 may include a MiFi module 510, a peer-to-peer application 520, a DRM agent 530, and operating system (OS)/applications 540.

MiFi module 510 may include hardware or a combination of hardware and software that may enable peer device 110 to act as a WiFi router for other peer devices 110. In one implementation, MiFi module 510 may receive signals from authentication server 130 and/or content server 140 via 3G/4G wireless network 125 and distribute the received signals to other peer devices 110 via a the local WiFi network.

Peer-to-peer (P2P) application 520 may include hardware or a combination of hardware and software for identifying available content (e.g., from content server 140), providing content to other peer devices 110, and/or obtaining content from other peer devices 110. Peer-to-peer application 520 may incorporate one or more transport and/or sharing protocols, such as BitTorrent™, FastTrack™, Direct Connect, peer-to-peer television (P2PTV), Peer Distributed Transfer Protocol (PDTP), etc. Peer-to-peer application 520 may also include decryption capabilities to decrypt encrypted content provided, for example, from donor peer device 110.

DRM agent 530 may include hardware or a combination of hardware and software that may retrieve security information from authentication server 130 to access content from content server 140. For example, DRM agent 530 may use P2P application 520 to help coordinate the transfer of DRM security information and DRM content from one peer device 110 to another, such as from donor peer device 110-1 to target peer device 110-2. DRM content may include, for example, music, images, video, and/or electronic books.

OS/applications 540 may include hardware or a combination of hardware and software for performing various support functions for other components of peer device 110 and for providing different functionalities of peer device 110. For example, OS/applications 540 may provide a browser as well as interfaces between the browser and the components in FIG. 2 (e.g., communication interface 260). In yet another example, OS/applications 540 may provide a TCP/IP stack to support communication applications, such as peer-to-peer application 520.

Although FIG. 5 shows example functional components of peer device 110, in other implementations, peer device 110 may include fewer functional components, different functional components, differently arranged functional components, and/or additional functional components than depicted in FIG. 5. Alternatively, or additionally, one or more functional components of peer device 110 may perform one or more other tasks described as being performed by one or more other functional components of peer device 110.

Figure 6:
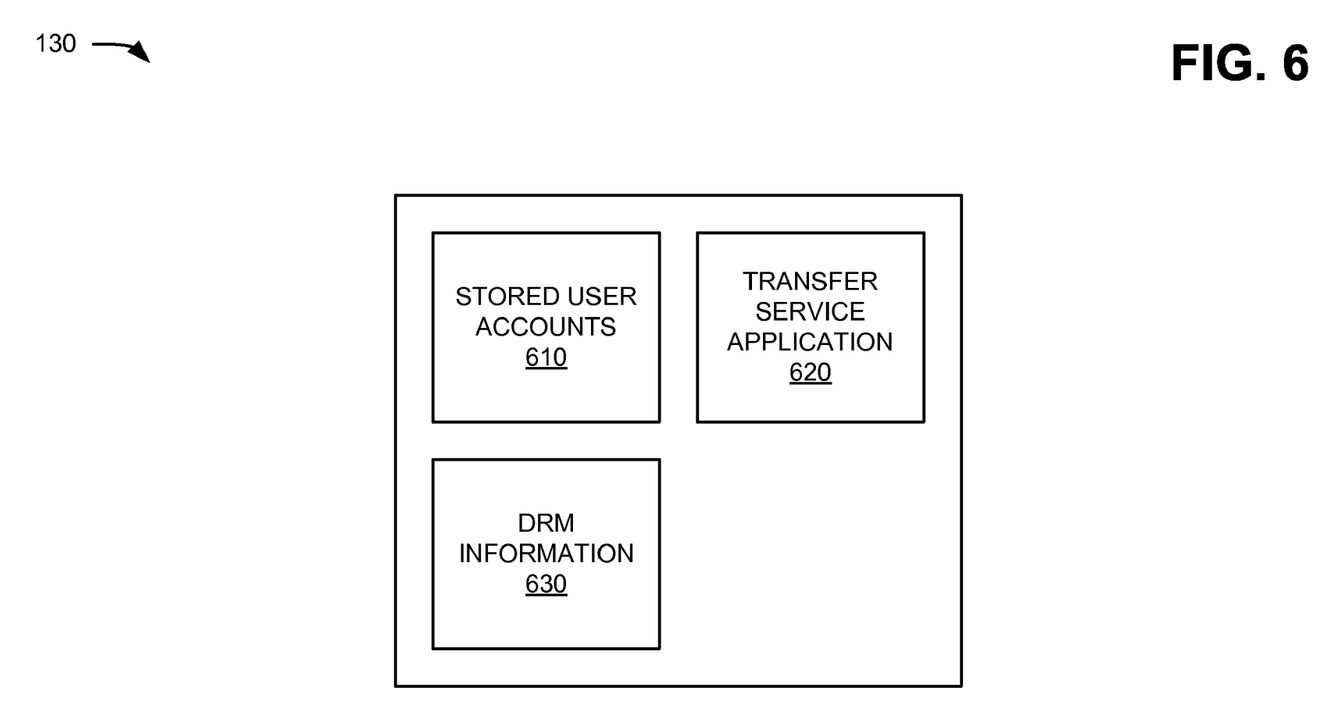
FIG. 6 is a diagram of example functional components of an authentication server of the network depicted in FIG. 1.

FIG. 6 is a diagram of example functional components of authentication server 130. In one implementation, the functions described in connection with FIG. 6 may be performed by one or more components of device 200 (FIG. 2). As shown in FIG. 6, authentication server 130 may include stored user accounts 610, a transfer service application 620, and DRM information 630.

Stored user accounts 610 may include account information associated with peer device 110. For example, stored user accounts 610 may include a history of previously requested digital content associated with peer device 110. Stored user accounts 610 may also include subscription information associated with each peer device 110. Subscription information may include, for example, a level of subscription service (basic, premium, promotional, etc.) associated with the user account, order histories, user preferences, etc.

Transfer service application 620 may include hardware or a combination of hardware and software to allow authentication server 130 to supervise DRM-based transfers from one peer device 110 (e.g., a donor peer device) to another peer device 110 (e.g., a target peer device). In one implementation, transfer service application 620 may receive credentials from a peer device 110 associated with a user to determine if the user is authorized to receive requested digital content. In another implementation, transfer service application 620 may receive a unique identifier associated with peer device 110 and use the unique identifier to obtain account information for the user.

DRM information 630 may include DRM security information used to control access to digital content. As used herein, "DRM security information" may refer to digital information that governs the rendering of content. DRM security information may be encrypted using a license key, which makes the information only usable on peer devices 110 having the license key.

Although FIG. 6 shows example functional components of authentication server 130, in other implementations, authentication server 130 may include fewer functional components, different functional components, differently arranged functional components, and/or additional functional components than depicted in FIG. 6. Alternatively, or additionally, one or more functional components of authentication server 130 may perform one or more other tasks described as being performed by one or more other functional components of authentication server 130.

Figure 7:
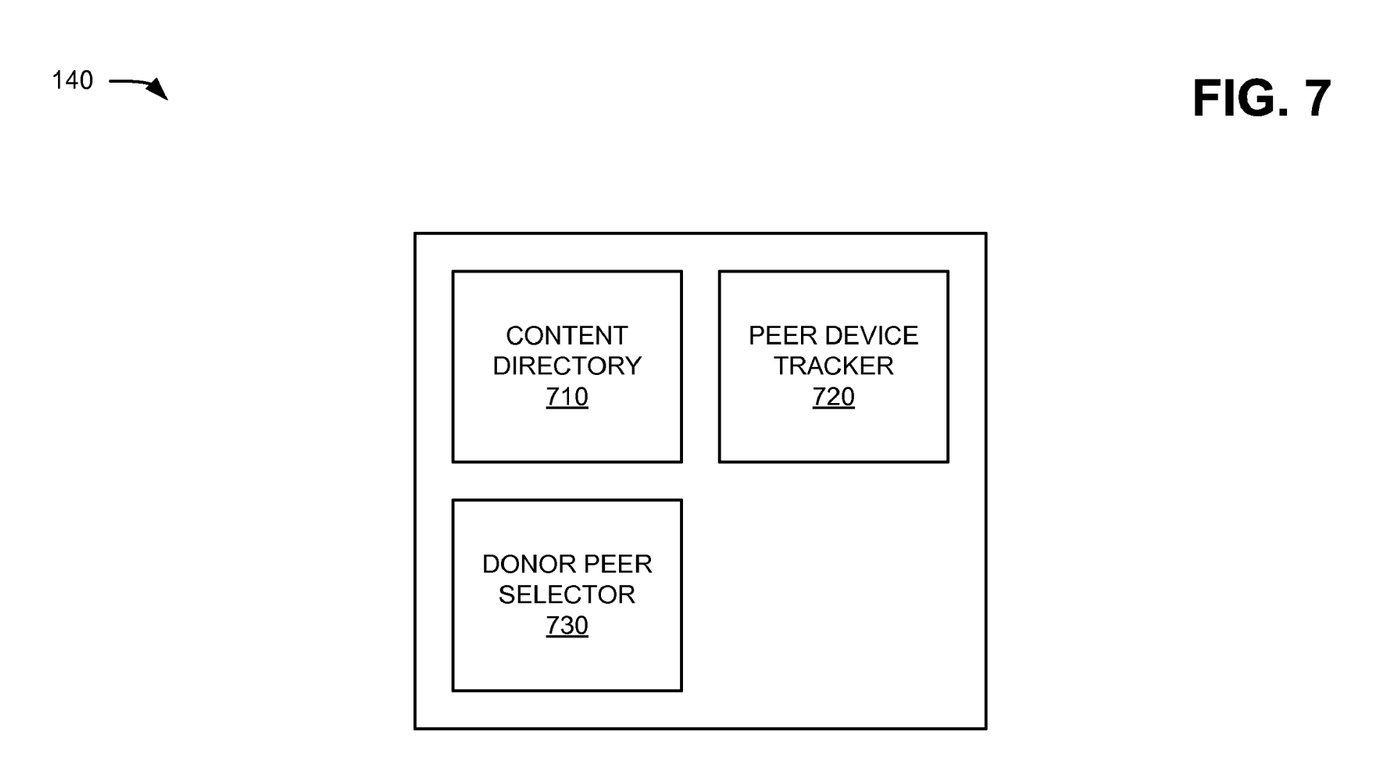
FIG. 7 is a diagram of example functional components of a content server of the network depicted in FIG. 1.

FIG. 7 is a diagram of example functional components of content server 140. In one implementation, the functions described in connection with FIG. 7 may be performed by one or more components of device 200 (FIG. 2). As shown in FIG. 7, content server 140 may include a content directory 710, a peer device tracker 720, and a donor peer selector 730.

Content directory 710 may include content references of content and/or links to content that may be retrieved by peer devices 110. In one implementation, content directory 710 may include a single file with a list of content that may be accessed by peer devices 110 and cross-referenced to peer devices 110 that have downloaded particular content. In another implementation, content directory 710 may be accessed by or provided to authentication server 130 to assist in authentication and/or verification processes.

Peer device tracker 720 may include hardware or a combination of hardware and software for tracking peer device 110 locations (e.g., latitude and longitude, or another geographic position indication) and/or states (e.g., whether peer devices 110 have MiFi capability and/or are currently connected to network 150). For example, peer device tracker may obtain location and/or state information from GPS updates provided by peer devices 110. Peer device tracker 720 may also associate multiple peer devices 110 within particular geographic areas to provide subsets of candidate donor peers for a target peer device. In another implementation, peer device tracker 720 may also track downloads by peer devices 110 and record download activity in content directory 710.

Donor peer selector 730 may include hardware or a combination of hardware and software to select a donor peer device (e.g., donor peer device 110-1) in response to a content request (e.g., content request 330) from a target peer device (e.g., target peer device 110-2). In one implementation, donor peer selector 730 may identify potential donor peers that have previously downloaded the content identified in content request 330. Previous downloads may be identified, for example, based on information in content directory 710. Donor peer selector 730 may then select a particular donor peer from a geographic area near the target peer device, based on location and/or state information from peer device tracker 720. In another implementation, donor peer selector 730 may first identify potential donor peers based on location and/or state information and then select a particular donor peer based on the download records.

In one implementation, donor peer selector 730 may confirm content availability with the particular donor peer (e.g., donor peer device 110-1) to verify the accuracy of content directory 710 (e.g., to confirm that particular downloaded content is still stored in a memory of the particular donor peer). For example, donor peer selector 730 may provide a file name or other indicator to the particular donor peer to determine if a match exists in the memory of the donor peer. Additionally, or alternatively, donor peer selector 730 may request a signal strength indication from the target peer device 110 (e.g., the peer device that initiated the content request). The signal strength indication may be used by donor peer selector 730 to determine a best available donor peer device (e.g., a peer device that has the requested content, has MiFi capability, and has the best signal for the target peer device).

Although FIG. 7 shows example functional components of content server 140, in other implementations, content server 140 may include fewer functional components, different functional components, differently arranged functional components, and/or additional functional components than depicted in FIG. 7. Alternatively, or additionally, one or more functional components of content server 140 may perform one or more other tasks described as being performed by one or more other functional components of content server 140.

Figure 8:
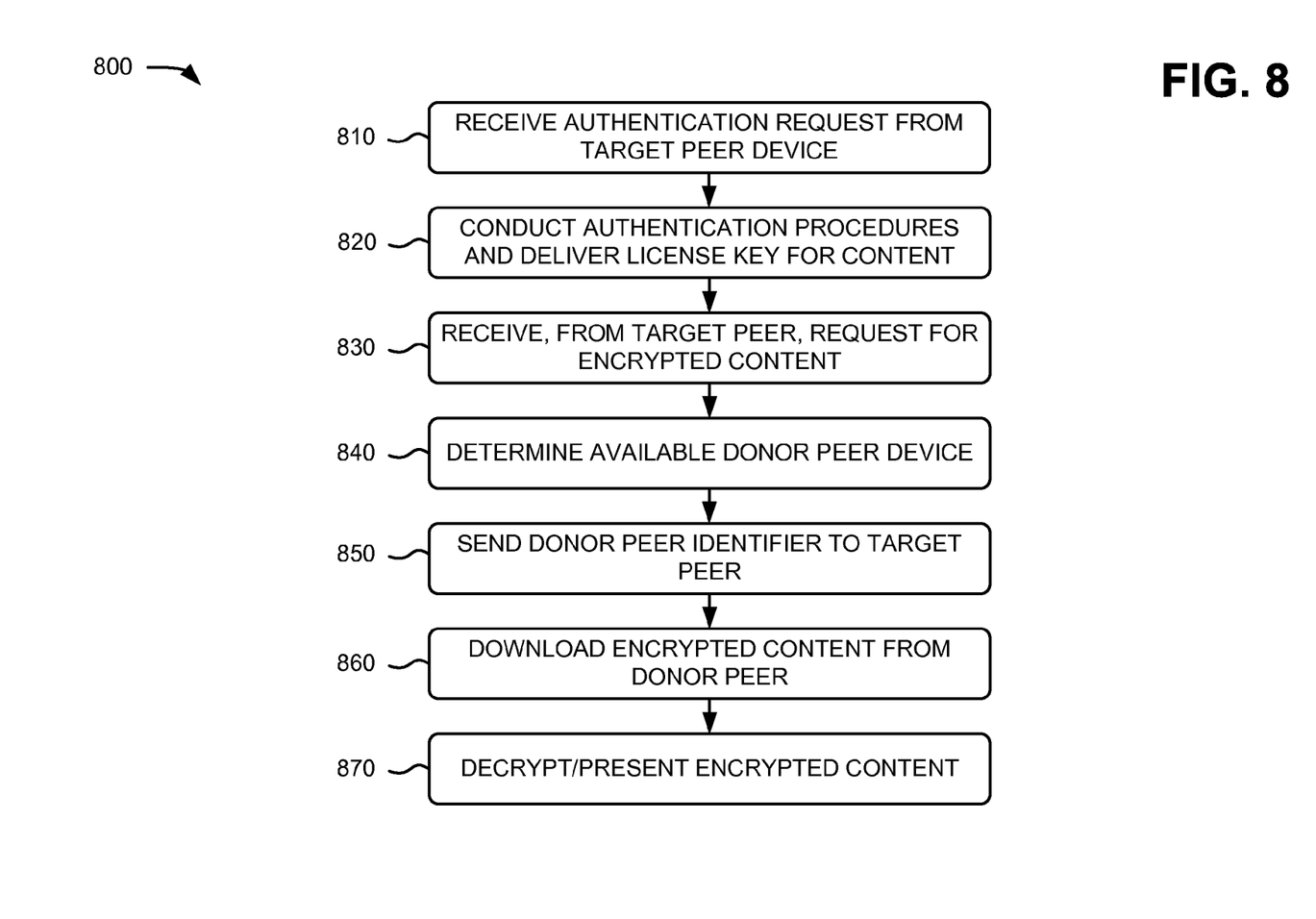
FIGS. 8 and 9 are flow charts of an example process for providing mobile content delivery optimization according to an implementation described herein.
Figure 9:
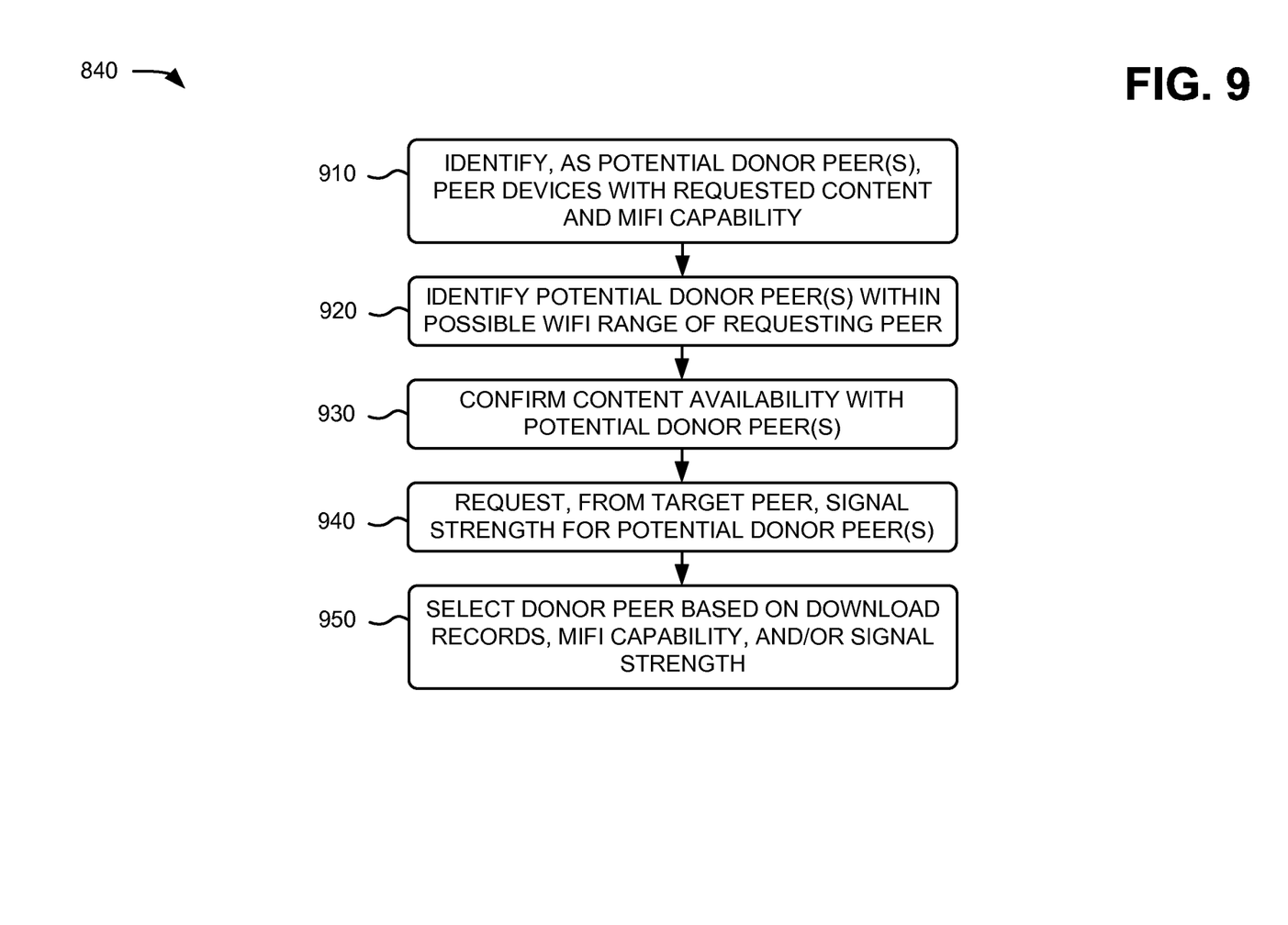

FIGS. 8 and 9 are flow charts of an example process 800 for providing mobile content delivery optimization according to an implementation described herein. Process 800 may be performed by one or more of authentication sever 130 and content server 140. In another implementation, some or all of process 800 may be performed by another device or group of devices, including or excluding authentication sever 130 and content server 140.

As illustrated in FIG. 8, process 800 may include receiving an authentication request from a target peer device (block 810), and conducting authentication procedures and delivering a license key for content (block 820). For example, in implementations described above in connection with FIG. 3, target peer device 110-2 may send authentication request 310, to authentication server 130, to be authenticated to receive the desired content. In one implementation, target peer device 110-2 may communicate with authentication server 130 through a HTTPS layer using 3G/4G wireless network 125 and network 150. Authentication request 310 may include, for example, credentials associated with target peer device 110-2 and/or a user account related to the purchase of the desired content. Authentication server 130 may receive authentication request 310. Assuming the credentials in authentication request 310 are accepted, authentication server 130 may authenticate target peer device 110-2 and verify that the user of target peer device 110-2 has purchased the requested content. Authentication server 130 may provide license keys for the purchased content to target peer device 110-2, as indicated by reference number 320. License key(s) 320 may also include, for example, a URL or another identifier to access the desired content on content server 140. In one implementation, license key(s) 320 may be provided to target peer device 110-2 using HTTPS over 3G/4G wireless network 125.

As further shown in FIG. 8, process 800 may include receiving, from the target peer device, a request for encrypted content (block 830), and determining an available donor peer device (block 840). For example, in implementations described above in connection with FIG. 3, target peer device 110-2 may send content request 330 to content server 140 to request the desired content. In one implementation, target peer device 110-2 may send content request 330 as a HTTPS data call over 3G/4G wireless network 125. Content server 140 may check if there is a nearby peer device (e.g., donor peer device 110-1) with WiFi capability that that has already downloaded the content listed in content request 330. The content may be stored, for example, in a memory (e.g., memory 230) of donor peer device 110-1. If a suitable donor peer (e.g., donor peer device 110-1) is identified, content server 140 may direct, via donor identifier 340, target peer device 110-2 to retrieve the requested content from donor peer device 110-1.

Returning to FIG. 8, process 800 may include sending donor peer identifier to the target peer device (block 850), downloading encrypted content from the donor peer device (block 860), and decrypting and/or presenting the encrypted content (block 870). For example, in implementations described above in connection with FIG. 3, target peer device 110-2 may receive donor identifier 340 and may send content request 350 to donor peer device 110-1 to request the desired content. In one implementation, target peer device 110-2 may send content request 350 to donor peer device 110-1 over a local wireless network (e.g., WiFi network 115). Donor peer device 110-1 may receive content request 350 and may send the requested content 360, with appropriate encryption, to target peer device 110-2 using, for example, WiFi network 115. Target peer device 110-2 may receive content 360 and apply license key(s) 320 to decrypt/present content 360 to the user.

Process block 840 may include the process blocks depicted in FIG. 9. As shown in FIG. 9, process block 840 may include identifying, as potential donor peer device(s), one or more peer devices with requested content and MiFi capability (block 910), and identifying the potential donor peer device(s) within possible WiFi range of the requesting peer device (block 920). For example, in implementations described above in connection with FIG. 7, content server 140 (e.g., donor peer selector 730) may identify potential donor peers that have previously downloaded the content identified in content request 330. Previous downloads may be identified, for example, based on information in content directory 710. Donor peer selector 730 may then select a particular donor peer from a geographic area near the target peer device, based on location and/or state information from peer device tracker 720.

Process block 840 may also include confirming content availability with potential donor peer device(s) (block 930), requesting, from the target peer device, a signal strength for the potential donor peer device(s) (block 940), and selecting a donor peer device based on download records, MiFi capability, and/or signal strength (block 950). For example, in implementations described above in connection with FIG. 7, content server 140 (e.g., donor peer selector 730) may confirm content availability with the particular donor peer (e.g., donor peer device 110-1) to verify the accuracy of content directory 710 (e.g., to confirm that particular downloaded content is still stored in a memory of the particular donor peer). Donor peer selector 730 may provide a file name or other indicator to the particular donor peer to determine if a match exists in the memory of the donor peer. Additionally, or alternatively, donor peer selector 730 may request a signal strength indication from the target peer device 110 (e.g., the peer device that initiated the content request). The signal strength indication may be used by donor peer selector 730 in conjunction with other information to determine a best available donor peer device (e.g., a peer device that has the requested content, has MiFi capability, and has the best signal for the target peer device).

Figure 10:
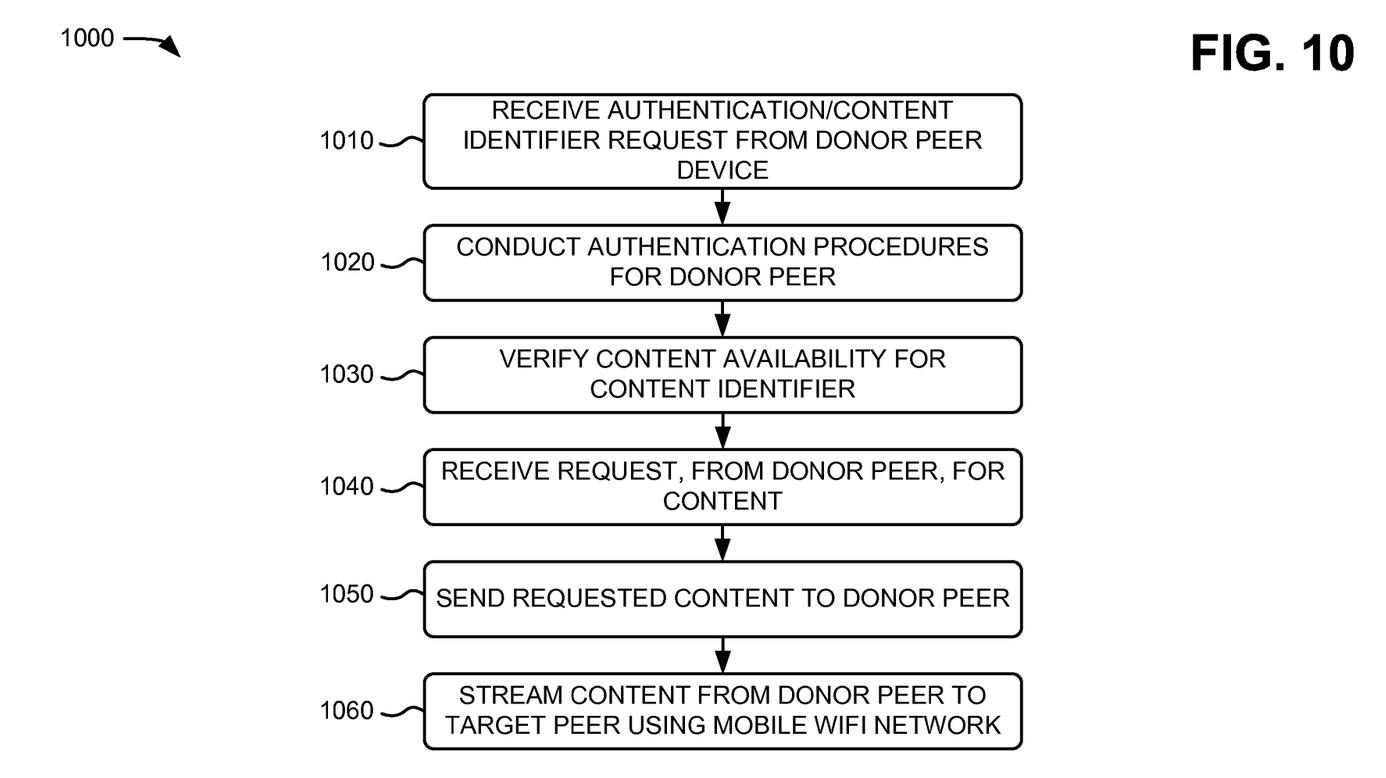
FIG. 10 is a flow chart of an example process for providing mobile content delivery optimization according to another implementation described herein.

FIG. 10 is a flow chart of an example process 1000 for providing mobile content delivery optimization according to another implementation described herein. In one implementation, process 1000 may be performed by one or more of authentication sever 130 and home network 160. In another implementation, some or all of process 1000 may be performed by another device or group of devices, including or excluding authentication sever 130 and home network 160.

As illustrated in FIG. 10, process 1000 may include receiving an authentication/content identifier request from a donor peer device (block 1010), conducting authentication procedures for the donor peer device (block 1020), and verifying content availability for the content identifier (block 1030). For example, in implementations described above in connection with FIG. 4, donor peer device 110-1 may send authentication request 410, to authentication server 130, to be authenticated to receive the personal content. Authentication server 130 may receive authentication request 410. Assuming the credentials in authentication request 410 are accepted, authentication server 130 may authenticate donor peer device 110-1 and verify that the requested personal content is available for streaming. Authentication server 130 may provide a verification signal to donor peer device 110-1, as indicated by reference number 420. Verification 420 may include, for example, a URL or another identifier to access the personal content on home network 160. In one implementation, verification 420 may be provided to donor peer device 110-1 using HTTPS over 3G/4G wireless network 125.

As further shown in FIG. 10, process 1000 may include receiving a request, from the donor peer device, for the content (block 1040). For example, in implementations described above in connection with FIG. 4, donor peer device 110-1 may send content request 430 to home network 160 to request the personal content. In one implementation, donor peer device 110-1 may send content request 430 as a HTTPS data call over 3G/4G wireless network 125. Home network 160 may receive and process content request 430.

Returning to FIG. 10, process 1000 may include sending the requested content to the donor peer device (block 1050), and streaming the content from the donor peer device to a target peer device using a MiFi network (block 1060). For example, in implementations described above in connection with FIG. 4, home network 160 may retrieve the requested personal content and provide content stream 440 to donor peer device 110-1, using for example, 3G/4G wireless network 125. Donor peer device 110-1 may receive content stream 440 and may send streaming URL 450 to one or more target peer devices 110-2 to enable target peer device(s) 110-2 to access content stream 440 from donor peer device 110-1 via a local wireless network (e.g., WiFi network 115).

Systems and/or methods described herein may receive, from a target user device and via a wireless access network, a request for stored content. The systems and/or methods may identify a donor user device (e.g., a donor user device that has previously downloaded the encrypted content) that is available to provide the encrypted content via a local wireless network connection. The systems and/or methods may send, to the target user device and/or the donor user device, instructions to establish a peer-to-peer connection, via the local wireless network, to provide the encrypted content to the target user device. The encrypted content may be decrypted by the target user device using a license key provided over a different network (e.g., the wireless access network) than the local wireless connection.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more computing devices, the method comprising:
  receiving, by a server device, an authentication request from a target user device to access encrypted content;
  conducting, by the server device, authentication procedures for the target user device;
  sending, when the target user device is authenticated and to the target user device, a license key for the encrypted content;
  receiving, by a content server and from the target user device, a request for the encrypted content, where the request originates via a wireless access network;
  determining, by the content server, that a donor user device is available to provide the encrypted content via a local wireless network that is different than the wireless access network, wherein the determining includes:
    identifying, as potential donor user devices, one or more user devices with mobile WiFi capability that have previously downloaded the encrypted content,
    identifying, from the potential donor user devices, one or more user devices within WiFi signal range of the target user device, and
    selecting the donor user device based on the identifying potential donor user devices and the identifying the one or more user devices within WiFi signal range; and
  sending, by the content server and to the target user, instructions to retrieve the encrypted content from the donor user device, where the encrypted content is decrypted by the target user device using the license key.

2. The method of claim 1, where the sending the license key for the encrypted content includes:
  sending the license key to the target user device via the wireless access network.

3. The method of claim 1, where the local wireless network is a mobile WiFi network.

4. The method of claim 1, where determining that the donor user device is available further comprises one or more of:
  confirming, with the donor user device, that the encrypted content is stored in a memory of the donor user device; or
  requesting, from the target user device, signal strength readings for the potential donor user devices.

5. The method of claim 1, where the authentication request and the request for encrypted content are sent over the wireless access network using a hypertext transfer protocol over secure socket (HTTPS) layer.

6. The method of claim 1, where the instructions to retrieve the encrypted content from the donor user device include an Internet protocol (IP) address.

7. The method of claim 1, further comprising:
  sending, by the content server and to the donor user device, instructions to establish a peer-to-peer connection, with the target user device, to provide the encrypted content.

8. A device, comprising:
  a memory to store a plurality of instructions; and
  a processor to execute instructions in the memory to:
    receive, from a target user device, a request for encrypted content, where the request is sent via a wireless access network,
    identify a donor user device that is available to provide the encrypted content via a local wireless network connection, wherein the identifying includes:
      identifying a group of user devices with local wireless network capability that have previously downloaded the encrypted content;
      identifying a group of local user devices within local wireless network signal range of the target user device; and
      selecting the donor user device based on identifying the group of user devices with local wireless network capability and identifying the group of local user devices within local wireless network signal range of the target user device, and
    send, to one or more of the target user device or the donor user device, instructions to establish a peer-to-peer connection, via the local wireless network connection, to provide the encrypted content to the target user device, where the encrypted content is decrypted by the target user device using a license key provided over a different network than the local wireless connection.

9. The device of claim 8, where, when identifying the donor user device, the processor is further to execute instructions to:
  confirm, with the donor user device, that the encrypted content is stored in a memory of the donor user device; or
  request, from the target user device, a signal strength reading for the donor user device.

10. The device of claim 8, where the target user device or the donor user device include one or more of:
  a radiotelephone,
  a personal communications system (PCS) terminal,
  a personal digital assistant (PDA),
  a wireless device,
  a smart phone,
  a laptop computer, or
  a global positioning system (GPS) device.

11. The device of claim 8, where the local wireless network includes a WiFi network.

12. The device of claim 8, where the instructions to establish a peer-to-peer connection include an Internet protocol (IP) address of one of the target user device or the donor user device.

13. A method implemented by one or more computing devices, the method comprising:
  receiving, by a server device and from a user device, an authentication request to access stored content, where the user device is mobile WiFi-enabled;

verifying, by the server device, availability of the stored content;

authenticating, by the server device, the user device;

receiving, by another server and from the user device, a request for the stored content, where the request is sent over a wireless access network;

sending, by the other server over the wireless access network, the stored content to the user device;

receiving, by the other server and from a target user device, a request for the stored content, where the request is sent over a wireless access network;

identifying, by the server device, the user device as having local wireless network capability;

identifying, by the server device, the user device as being within local wireless network signal range of the target user device;

selecting, by the server device, the user device as a donor device, based on the identifying that the user device has local wireless network capability and the identifying that the user device is within local wireless network signal range of the target user device; and sending, by the user device and via a mobile WiFi connection that is different than the wireless access network, the stored content to the target user device.

14. The method of claim 13, where sending the stored content to the user device includes streaming the stored content, and where sending the stored content to the target user device includes streaming the stored content.

15. The method of claim 13, where the server is an authentication server within a service provider network and the other server is a device within a home network.

16. The method of claim 13, further comprising:
sending, to the target user device and via a short message service (SMS) message, an invitation to retrieve the stored content, where the SMS message includes a uniform resource locator (URL) for the user device; and receiving, based on the URL and via the mobile WiFi connection, a request, from the target user device, to receive the stored content.

17. A system, comprising:
means for receiving, from a target user device and via a wireless access network, a request for stored content;

means for identifying a donor user device that is available to provide the stored content via a local wireless network connection that is different than the wireless access network, wherein the means for identifying includes:

means for identifying, as potential donor user devices, one or more user devices with local wireless network capability that have previously downloaded the stored content, means for identifying, from the potential donor user devices, one or more user devices within local wireless network signal range of the target user device, and means for selecting the donor user device based on the identifying potential donor user devices and the identifying the one or more user devices within local wireless network signal range; and means for sending, to the target user device, instructions to establish, via the local wireless network connection, a peer-to-peer connection with the donor user device to provide the stored content to the target user device.

18. The system of claim 17, further comprising:
means for sending, to the target user device, a license key for the decrypting the stored content.

* * * * *